United States Patent [19]

Konwal

[11] Patent Number: 4,721,422
[45] Date of Patent: Jan. 26, 1988

[54] BORING BAR

[76] Inventor: Ignatius Konwal, 335 Parkview Ave., Elmhurst, Ill. 60126

[21] Appl. No.: 899,152

[22] Filed: Aug. 22, 1986

[51] Int. Cl.[4] .............................................. B23B 27/16
[52] U.S. Cl. ................................... 408/233; 407/101; 407/109; 408/713
[58] Field of Search .............. 408/197, 231, 233, 713, 408/226; 407/91, 101, 102, 107, 109, 110, 111

[56] References Cited

U.S. PATENT DOCUMENTS

| | | | |
|---|---|---|---|
| 3,289,273 | 12/1966 | Artaud | 407/101 |
| 3,726,352 | 4/1973 | Olov Roos | 408/233 X |
| 3,795,454 | 3/1974 | Elchyshyn | 408/197 |
| 4,087,194 | 5/1978 | Takacs et al. | 408/713 X |
| 4,229,128 | 10/1980 | Heisner | 408/197 X |

FOREIGN PATENT DOCUMENTS 837571  6/1981  U.S.S.R. ................ 408/233

*Primary Examiner*—Gil Weidenfeld
*Assistant Examiner*—Steven C. Bishop

[57] ABSTRACT

A two piece boring bar, one piece of which provides a recessed free end to which a cutting bar extension member is attached. When a cutting element as a separated component is used it may be removably secured upon the free end of the boring bar extension by a clamp that in turn provides a conically shaped socket which receives the similarly shaped head of a connecting member, threadable into the end portion of the boring bar extension, outside the boundaries of the recess formed therein. The clamp is also provided with a bendable depending stud projectable into an aperture formed outside the recess in parallel relation to the threaded connection of the clamp fastener, for locating and maintaining the clamp in position prior to its clamping engagement with the cutting element.

11 Claims, 5 Drawing Figures

BORING BAR

FIELD OF INVENTION

This invention relates to an improvement in the removable attachment of a cutting element to the operative end of a boring bar. This invention permits indirect attaching of the cutting element to the boring bar. By indirect attachment it is meant that the cutting element need not be disruptive by having a notch or hole formed therein for cooperating with cooperative connecting elements furnished by the boring bar. This arrangement is shown in U.S. Pat. No. 4,227,841 which discloses a carrier yoke into which the cutting element is projected prior to the attachment of the yoke to the end of the boring bar. Disruption of either the cutting element or the attaching element is undesirable in that it inherently weakens either or both of the members and leads to malfunction of the device when in use.

BRIEF SUMMARY OF THE INVENTION

With the foregoing in mind, it is an object of this invention to provide an improved boring bar construction which substantially reduces the above and other problems in construction of known prior boring bars.

The principal object of this invention is to provide a two piece boring bar. The boring bar may also include a fastener clamp by which a element is attached to the end of the boring bar extension.

Another object of this invention is that the means of attaching the cutting element of the free end of the boring bar extension is of such a construction that it readily permits adjustment of the cutting element into selective operative positions.

A still further object of this invention is to provide an attaching means for a cutting element of a boring bar which may readily be adapted to simultaneously attach cutting elements and other boring elements of various thicknesses to the end of the boring bar without additional structure or associate elements.

BRIEF DESCRIPTION OF THE DRAWINGS

The invention will be best understood by reference to the accompanying drawings in which the preferred mode of construction is illustrated and by which the stated objects of the invention are achieved, and in which.

Figure 1:
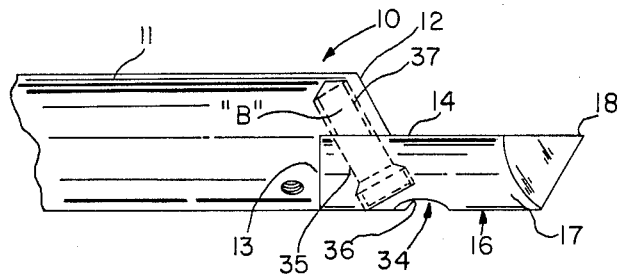
FIG. 1 is a side elevational view of a boring bar and the fastening means of this invention incorporated thereon.
Figure 2:
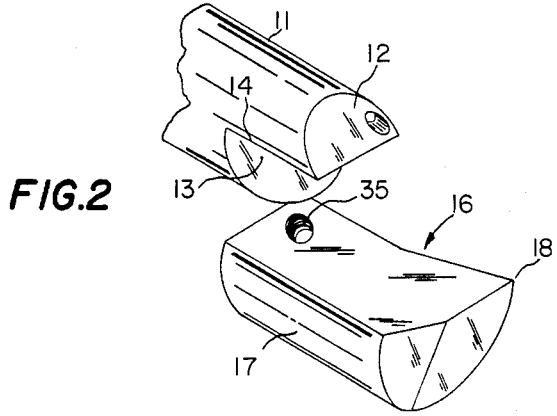
FIG. 2 is a perspective exploded view of the invention as shown in FIG. 1.

Referring more specifically to the drawings in the preferred embodiment of the invention the boring bar comprises an elongated body 10, the shank or rear portion 11 of which is adapted to be connected to a lathe or turning machine or other device adapted for boring operations. The free end 12 of the body 10 is provided with a partial transverse cut 13 which mates with an axial cut line 14 to provide an open socket-like area on the free end 12 of the body 10. An angled wall extends upwardly from the line 14 finishing the free end 12 as shown.

Adapted to be mounted in the cut out portion of the body 10 is a tool extension member or tool holder 16. The tool holder 16 comprises a semi-circular body 17 the major portion of which extends axially of the shank 11 and conforms to the periphery of the body 10. Extending through the extension member 16, commencing with an elliptical recess, and continuing in a bisecting plane is a passage for the free reception of the shank of a self aligning threaded connector. A continuing threaded bore is joined from the axial cut 14 into the body 10 and threadably receives the connector to attach the extension member 16 to the free end 12 of the body 10.

In some construction, at the forward free end of the holder 16 there is a radial projection that laterally extends beyond the periphery of both the shank 11 and holder 16. This lateral extension terminates into an operational point 18 which is at the distal end of the holder 16 and well beyond the periphery thereof.

On the top flat surface 19 extending substantially along an axial line of the shank 11, the holder 16 is notched to provide a triangular recess 20, one point of which extends out into the operational point 18 of the lateral extension as shown. Adapted to seat in the recess 20 is a triangularly shaped cutting element 21. This cutting element 21 is of a size so as to have a cutting edge 22 projected beyond the forward line 23 of the free end of the projection of the holder 16.

Figures 3, 4:
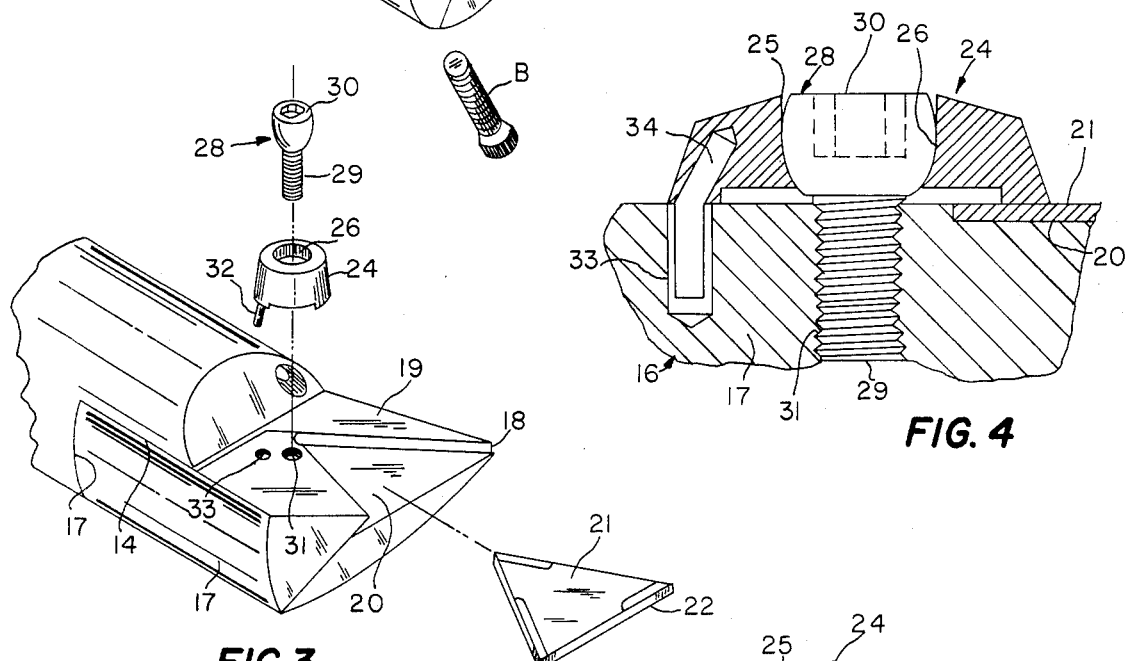
FIG. 3 is a fragmentary perspective view of the elements of this invention shown in exploded relation.
FIG. 4 is a fragmentary detailed sectional view showing the fastening means of this invention.

To secure the cutting element 21 in an operative position on the holder 16 there is provided a clamp 24. This clamp 24 is provided with a centrally located socket 25 which, as clearly shown in FIG. 4, is semi-conical in shape so as to provide inwardly curved wall 26 which terminates into a circular passage 27 communicating through the bottom clamp 24. A modified head screw with an internal hex socket is provided and it includes a threaded shank portion 29 that terminates into a conically shaped head 30, which corresponds in configuration to the conical shaped socket 25 formed in the clamp 24. This screw 28 is adapted to be threaded into a threaded aperture 31 formed in the top wall surface of the holder 16, adjacent to but well out of the triangular recess 20 formed in the holder 16.

The clamp 24 also provides a depending spring pin 32. This pin 32 is adapted to be projected into a suitable aperture 33 that extends parallel to the aperture 31 that receives the shank 29 of the screw 28.

By this arrangement when the cutting element 21 is placed in the recess 20, the clamp 24 will have its pin 32 inserted into the aperture 33 so that it is positioned to extend over the recess 20, such that its underside engages the exposed surface of the cutting element 21 as well as a substantial portion of the surrounding top wall of the holder 16. The screw 28 is then placed into the head hex socket 30 and threaded into the aperture 31 until the clamp 24 firmly secures the cutting element 21 in the recess 20 in an operative position.

In the boring art if often becomes necessary to replace the cutting element and/or its support by different formed cutters and other boring equipment. To facilitate this interchange the present two piece boring bar as described permits easy and convenient changes between the extension member 16 and the shank 11 end of the boring bar 10. The undercut as formed by the transverse cut 13 and the axial cut 14 in the free end of the shank 11 of the boring bar 10 provides a solid receiving area for securing thereto different extension members. As the boring bar is normally circular in cross section it is required that at least a portion of the extension member also provides a partial circular wall the periphery of which will match the periphery of the shank 11. It is also of importance that the means for attaching the extension to the free end of the shank be such that it not disrupt the periphery of the tool. To accomodate this, the extension member is normally provided with a circular recess 34. This recess 34 has communication with a smooth bore 35 which extends obliquely from the inner curved surface 36 of the recess 34 through the extension member 16 and mates with a like threaded bore 37 formed in the overlying portion of the shank 11 adjacent to the undercut. By this simple arrangement any form of extension member may be readily attached to the free end of the shank 11.

Figure 5:
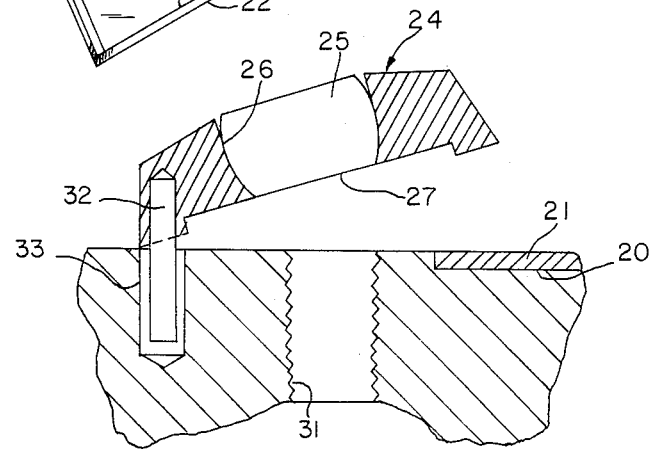
FIG. 5 is a fragmentary detailed sectional view showing the fastening means adapted to the cutting element and additional boring attachments.

With respect to the restraining pin 32 it is preferably formed from spring steel such that it has the capacity of bending throughout its longitudinal length. It should also be noted that the connection of the clamp 24 to the extension member, will permit readily adjustment of the cutting element 21 relative to the recess 20, by simply loosening of the fastener or screw 28 sufficient to permit play between the confronting semi-conically shaped walls of the socket 25 and the hex head of the screw 28. This freedom of movement when accompanied by the yieldability of the pin 32 will permit the clamp 24 to be disengaged from the cutting element 21 so that the same may be positioned as desired. It should also be noted that through the same arrangement the boring bar may have a second element secured by the clamp 24 as shown in FIG. 5. As illustrated the clamp 24 may be tilted so as to accommodate a chip breaker 38 which may be positioned in operative relation to the cutting element 21.

From the foregoing I have described a novel boring bar construction which consists of two pieces, portions of which are of like configuration and which may be readily attached axially with respect to each other to form an operative boring tool. There has also been described a novel tool element clamping means by which various sized cutting elements may be mounted on the free end of the boring bar without the necessity of other than a simple hex wrench. It has also been disclosed that the clamping element has an arrangement for self alignment whereby it may assume various elevations to accommodate a multitude of boring tools or accommodate single cutting elements of various thicknesses. All of these advantages are achieved without reducing the structural integrity of the boring bar, the boring tools associated therewith nor the clamping mechanism employed.

While I have described and illustrated the preferred form of construction for carrying my invention into effect, this is capable of variation and modification without departing from the spirit of the invention. I therefore, do not wish to be limited to the precise details of construction as set forth, but desire to avail byself of such variations and modifications as come within the scope of the appended claims.

Having thus described my invention, what I claim as new and desire to protect by Letters Patent is:

1. A boring bar providing an elongated body having a free end configuration that provides an attachment area for a bar extension member comprising;

(a) a removable body extension member being semicircular in cross section and providing a substantially flat bearing surface projecting axially beyond said boring bar,
(b) means for removably attaching said body extension member to the free end of the boring bar,
(c) a cutting element positioned upon said flat bearing surface of said body extension member, outwardly of the elongated body of the boring bar and having a cutting edge extending beyond the free end of said body extension member,
(d) a clamp of a size to overlie a portion of said cutting element and said flat surface for securing said cutting element thereon, with said clamp lying within the periphery of the elongated body of the boring bar,
(e) said clamp providing a conically shaped passage therethrough for the reception of a threaded fastener,
(f) a threaded fastener having a conically shaped head to mate within said conically shaped passage formed in said clamp when projected therein and threadable into said body extension at a point beyond the end of the boring bar for clamping said cutting element to the free end of said body extension member, and
(g) a yieldable positioning stud depending from said clamp and freely projectable into an aperture formed in the flat bearing surface of said body extension member adjacent and parallel to the point of threadable contact of said fastener with said body extension member that permits free rocking movement of said clamp relative to said cutting element during the clamping of said cutting element onto said flat bearing surface of said body extension member.

2. A boring bar as defined by claim 1 including a recess formed in the flat bearing surface of said body extension member that extends outwardly of the free end of the elongated body of the boring bar.

3. A boring bar as defined by claim 1 wherein said cutting element comprises a substantially flat member which is adapted to lie flat on the flat bearing surface provided by said removable body extension member.

4. A boring bar as defined in claim 1 including a triangularly shaped recess formed in the flat bearing surface of said body extension member that extends outwardly of the free end of the elongated body of the boring bar.

5. A boring bar as defined by claim 1 wherein said cutting element comprises a substantially flat triangularly shaped member which is adapted to lie flat on the flat bearing surface provided by said removable body extension member.

6. A boring bar as defined by claim 1 including a substantially triangularly shaped recess formed in the flat bearing surface of said body extension member and wherein said cutting element comprises a substantially flat triangularly shaped member formed to lie in said triangularly shaped recess with one edge thereof protruding beyond the free end of said body extension member.

7. A boring bar as defined by claim 1 wherein said clamp comprises a cap having a thickness sufficient enough to have formed therein a conically shaped passage and with said cap providing peripherally disposed depending members which are positionable upon the flat bearing surface of said body extension member and the cutting element when said cap is used to secure said cutting element onto said boring bar.

8. A boring bar as defined by claim 7 including a recess formed in the flat bearing surface of said body extension member that extends outwardly of the free end of the elongated body of the boring bar.

9. A boring bar as defined by claim 7 wherein said cutting element comprises a substantially flat triangularly shaped member which is adapted to lie flat on the flat bearing surface provided by said removable body extension member.

10. A boring bar as defined by claim 7 including a substantially triangularly shaped recess formed in the flat bearing surface of said body extension member and wherein said cutting element comprises a substantially flat triangularly shaped member formed to lie in said triangularly shaped recess with one edge thereof protruding beyond the free end of said body extension member.

11. A boring bar as defined by claim 1 wherein said positioning stud comprises an enlongated yieldable steel spring pin carried in a depending fashion from said clamp and being of a size smaller that the aperture formed in the flat bearing surface of said body extension member whereby it has slight free pivotal movement therein, with said pin being capable of yielding out its longitudinal length when said clamping member is positioned upon an uneven surface during its clamping operation.

* * * * *